US008721760B2

(12) United States Patent
Kweeder et al.

(10) Patent No.: US 8,721,760 B2
(45) Date of Patent: May 13, 2014

(54) COMPOSITIONS COMPRISING AMMONIUM NITRATE DOUBLE SALTS

(75) Inventors: James A. Kweeder, Chesterfield, VA (US); Nancy E. Iwamoto, Ramona, CA (US)

(73) Assignee: Honeywell International Inc., Morristown, NJ (US)

( * ) Notice: Subject to any disclaimer, the term of this patent is extended or adjusted under 35 U.S.C. 154(b) by 672 days.

(21) Appl. No.: 11/622,939

(22) Filed: Jan. 12, 2007

(65) Prior Publication Data

US 2007/0199357 A1 Aug. 30, 2007

Related U.S. Application Data

(60) Provisional application No. 60/759,121, filed on Jan. 13, 2006.

(51) Int. Cl.

| | |
|---|---|
| ***C05C 1/00*** | (2006.01) |
| ***C05C 5/00*** | (2006.01) |
| ***C05C 5/02*** | (2006.01) |
| ***C05C 5/04*** | (2006.01) |

(52) U.S. Cl.

USPC ................. 71/33; 71/36; 71/50; 71/58; 71/59

(58) Field of Classification Search

USPC ............ 71/31–36, 61, 50; 423/396, 369, 397; 149/46, 47

See application file for complete search history.

(56) References Cited

U.S. PATENT DOCUMENTS

| | | | | |
|---|---|---|---|---|
| 1,910,807 | A * | 5/1933 | Mohler | 423/396 |
| 2,061,191 | A * | 11/1936 | Foss et al. | 423/143 |
| 2,399,987 | A | 5/1946 | Cornell et al. | |
| 3,173,756 | A * | 3/1965 | Griffith | 423/396 |
| 3,241,947 | A | 3/1966 | Young | |
| 3,366,468 | A | 1/1968 | Porter | |
| 3,582,313 | A * | 6/1971 | Strelzoff | 71/35 |
| 4,124,368 | A * | 11/1978 | Boyars | 71/59 |
| 4,316,736 | A | 2/1982 | Van Hijfte | |
| 4,481,048 | A | 11/1984 | Cady et al. | |
| 4,698,175 | A * | 10/1987 | Gourlaouen et al. | 252/182.33 |
| 5,723,812 | A * | 3/1998 | Berteleau et al. | 149/46 |
| 6,500,223 | B1 * | 12/2002 | Sakai et al. | 71/64.07 |
| 6,641,622 | B2 * | 11/2003 | Sampson et al. | 23/294 R |
| 6,689,181 | B2 | 2/2004 | Highsmith et al. | |
| 6,887,326 | B2 * | 5/2005 | Williams et al. | 149/109.6 |
| 6,902,637 | B2 * | 6/2005 | Blomquist | 149/109.6 |

FOREIGN PATENT DOCUMENTS

| | | | |
|---|---|---|---|
| FR | 1 368 035 | | 7/1964 |
| GB | 1215016 | | 12/1970 |
| RU | 2223934 | | 2/2004 |
| RU | 2237046 | | 9/2004 |
| RU | 2259979 | | 9/2005 |
| RU | 2279416 | C2 | 7/2006 |
| WO | 02/40427 | A | 5/2002 |

OTHER PUBLICATIONS

Oxley et al. “Ammonium nitrate: thermal stability and explosivity modifiers” 2002, Thermochimica Acta, 382, p. 23-45.*

Oliver, S., et al., Crystal Structures of a Series of Novel Alkylammonium Phosphates and Their Formation in Aluminophosphate Synthesis Mixtures, Inorg. Chem., 1998, 37, 5021-5028.

Corresponding Japanese Patent Application No. 2008-550551 (translation), dated Jul. 29, 2013—enclosing record of prior art search result.

Ando, Junpei, et al., Compounds in Mixed Nitrate Fertilizers and their Behavior, The Chemical Society of Japan, 1994, No. 9, pp. 1617-1622.

Forsyth, J.B, Comparison of Two Sources of Nitrogen for Peach Trees, The Agricultural Gazette of New South Wales, 1971, vol. 82, pp. 227-229.

Roy, A.K, et al., A Method for Direct Estimation of Calcium Nitrate in Calcium Ammonium Nitrate Fertilizer, Technology, 1964, vol. 1, No. 3, pp. 31-32.

Fiedler, Linde, et al., Nitrogen Form and Nitrogen Increase Trial, Albrecht Thaer Archiv, 1964, Vo.l. 8, Book 8/9, pp. 649-673.

McClellan, G.H., et al., Crystallography of (NH4)3SiF6NO3-, J. Appl. Cryst., 1969, vol. 2, pp. 305-306.

Potekhin, V.A., et al., Solubility in the System Water Potassium Nitrate Ammonium Nitrate, J. Inorganic Chem., 1968, vol. 13, No. 10, pp. 2848-2850.

Malquori A., et al., Contribution to the knowledge of complex fertilizing components, La Chimica e l’industria, 1964, vol. 46, No. 6, pp. 637-647.

* cited by examiner

*Primary Examiner* — Wayne Langel
*Assistant Examiner* — Syed Iqbal
(74) *Attorney, Agent, or Firm* — Faegre Baker Daniels LLP

(57) ABSTRACT

Preferred aspects of the present invention provide ammonium nitrate compositions comprising ammonium nitrate and at least a second compound, said second compound being present under conditions and in amounts effective to substantially reduce the detonation sensitivity of the composition and/or to otherwise improve a desired property of the composition. In certain embodiments, the second compound is selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. In preferred embodiments, at least a substantial portion of the ammonium nitrate in the composition is in the form of a double salt with one or more of said second compounds. In highly preferred embodiments, the present compositions consist essentially of one or more double salts of ammonium nitrate and a second compound as described herein.

20 Claims, No Drawings

COMPOSITIONS COMPRISING AMMONIUM NITRATE DOUBLE SALTS

CROSS-REFERENCES TO RELATED APPLICATIONS

This application is related to and claims the priority benefit of U.S. provisional application No. 60/759,121 filed Jan. 13, 2006, which is incorporated herein by reference.

FIELD OF THE INVENTION

The present invention relates to ammonium nitrate compositions, and more particularly to ammonium nitrate compositions comprising one or more ammonium nitrate double salts. The compositions of the present invention are generally useful as fertilizers and preferably have desirable levels of nitrate ions and relatively high resistance to detonation.

BACKGROUND OF THE INVENTION

It is well known that, because of its high concentration of nitrate ions, ammonium nitrate has important uses in the field of agriculture in general and fertilization in particular. However, it is also well known that ammonium nitrate, in many of the forms in which it has heretofore been commonly used, is relatively difficult and potentially hazardous to handle commercially in large amounts, and/or to store in great masses (such as occur in commercial warehouses and storage bins), especially for relatively long periods of time. Furthermore, it has been known that many of the forms of ammonium nitrate heretofore commonly used have had a tendency to detonate under relatively mild conditions, and have therefore sometimes been abused and misused as an explosive material.

The use of ammonium nitrate in the form of a double salt with ammonium sulfate for the purpose of reducing the hazardous properties of the ammonium nitrate has been suggested in U.S. Pat. No. 6,689,181, which is incorporated herein by reference. On the other hand, the use of ammonium nitrate in the form of a double salt diethylenetriamine trinitrate has been suggested for use because of its increased explosive properties and detonation tendencies. See, for example, U.S. Pat. No. 4,481,048. Thus, it is difficult to predict in advance with any degree of precision what impact, if any, a particular form of ammonium nitrate, particularly ammonium nitrate in the form of a double salt, will have on the explosive properties of the material or the tendency of the material to detonate.

SUMMARY OF THE INVENTION

Preferred aspects of the present invention provide ammonium nitrate compositions comprising ammonium nitrate and at least a second compound, said second compound being present under conditions and in amounts effective to substantially reduce the detonation sensitivity of the composition and/or to otherwise improve a desired property of the composition. In preferred embodiments, the second compound is selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. In preferred embodiments, at least a substantial portion of the ammonium nitrate in the composition is in the form of a double salt with one or more of said second compounds. In highly preferred embodiments, the present compositions consist essentially of one or more double salts of ammonium nitrate and a second compound as described herein.

Another aspect of the present invention provides methods for reducing the sensitivity to detonation of compositions containing ammonium nitrate by including in such compositions one or more additional compounds effective to substantially reduce the detonation sensitivity of the composition, said additional compound preferably being selected from the group consisting of ammonium sulfate, ammonium phosphate, calcium nitrate, potassium nitrate, magnesium nitrate, ammonium molybdenate, ammonium hexafluorosilicate, neodymium hydroxynitrate, and combinations of two or more of these. Preferably, said one more additional compounds are incorporated into the composition under conditions effective to produce at least one double salt of ammonium nitrate and one more of said additional compounds.

Another aspect of the present invention relates to a composition, and preferably a fertilizer, comprising ammonium nitrate in combination with at least a second compound selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. In preferred embodiments, said combination of ammonium nitrate and said at least a second compound comprises a double salt of ammonium nitrate and at least one of said second compounds. The preferred compositions exhibit a reduced sensitivity to detonation relative to compositions consisting essentially of ammonium nitrate.

Another aspect of the present invention relates to methods of handling fertilizer compositions comprising providing a substantially non-detonable fertilizer composition comprising ammonium nitrate in combination with at least a second compound selected from the group consisting of ammonium sulfate, ammonium phosphate, calcium nitrate, potassium nitrate, magnesium nitrate, ammonium molybdenate, ammonium hexaflouralsilicate, neodymium hydroxynitrate, and combinations of two or more of these. In preferred embodiments at least a portion, more preferably at least a substantial portion, and even more preferably substantially all of said ammonium nitrate in said composition is present in the form of a double salt with one or more of said second compounds. The present handling methods include methods of transporting fertilizer, methods of storing fertilizer and methods of applying fertilizer to soil or other growing material.

As used herein, the term "ammonium nitrate composition" refers broadly to compositions which contain ammonium nitrate in any form, including as double salt with other compounds.

As used herein, the term "double salt" is refers to a salt made up of at least two different types of cations and one type of anion or of at least two different types of anions and one type of cation. Thus, the term "double salt of ammonium nitrate" is understood to mean a combination of ammonium nitrate and another compound in such a way as to form new compound which is crystallocrystaligraphically distinct from the either of the constituents.

In preferred embodiments the compositions, including the fertilizers and other materials of the present invention, have a relatively low concentration of single salt AN. As used herein the term "single salt AN" refers to a salt in which substantially all of the cations are ammonium and substantially all of the anions are nitrate. In highly preferred embodiments the compositions and materials of the present invention have no substantial amount of single salt AN, and in certain embodiments the compositions contain not more than trace amounts of single salt AN.

Preferably the present compositions, particularly in the form of fertilizers and when used in connection with methods involving handling the fertilizers, are not considered hazardous materials under Title 49 of the Code of Federal Regulations, "Transportation", Part 172, "Hazardous Materials Table", Oct. 1, 2000, and are also preferably not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

DETAILED DESCRIPTION OF PREFERRED EMBODIMENTS

One aspect of the present invention provides compositions preferably having desirable agricultural properties, such as would be required for fertilizers and the like, and a high detonation resistance in comparison to single salt AN. In preferred embodiments, the present invention provides fertilizer compositions comprising one or more double salts of the formula (I):

$$(M).n(NH_4NO_3).m(H_2O) \quad (I)$$

where

M is a cation-anion pair selected from the group consisting of ammonium phosphate, calcium nitrate, potassium nitrate, magnesium nitrate, ammonium molybdenate, ammonium hexaflouralsilicate and neodymium hydroxynitrate, n is from about 0.2 to about 3, and m is from about 0 to about 10.

In preferred embodiments the present compositions are characterized as being comprised of, and preferably consisting essentially of, components (preferably double salts) that are low exotherm components and/or that are resistant to cohesion loss.

More specifically, in preferred embodiments the present compositions are characterized as being comprised of, and preferably consisting essentially of, components of compound of formula (I) that exhibit at least a 2 fold increase in reaction stability over that of ammonium nitrate, where the reaction stability difference is determined by comparison of the reaction exotherms of (I) to that of ammonium nitrate. The reaction exotherm as used herein is defined by the energy evolved during the decomposition reaction of compound of formula (I) into compositional parts which include (but are not all encompassing) NO, NO2, N2O, N2, H2O, NH3 and HNO3. Preferably, the reaction exotherm of the preferred double salts of the present invention, as used in the present composition and fertilizers, is substantially greater than about the reaction exotherm of AN, and even more preferably is substantially greater than about the reaction exotherm of the 2:1 ANS double salt.

It is also preferred in many embodiments that the present compositions are characterized as being comprised of, and preferably consisting essentially of, components, and particularly double salts, that exhibit a cohesive stability temperature of at least about 500° K, and even more preferably at least about 600° K. As used herein, cohesion stability temperature refers to the temperature at which the components of the double salt begin to show significant loss of cohesion. It is also preferred that the present compositions are characterized as being comprised of, and preferably consisting essentially of, components, and particularly double salts, that exhibit higher cohesion stability than that of ammonium nitrate, where the cohesive stability difference is determined by comparison of the cohesive exotherms of the compound of formula (I) to that of ammonium nitrate. In a preferred embodiment, the improvement in cohesion stability is a two-fold increase in stability from ammonium nitrate. As used herein, cohesive exotherm means the thermodynamic free energy released as the bulk material represented by $[(M).n(NH_4NO_3).m(H_2O)]_n$ (II), decomposes to the compositional parts represented by (I) and where a cohesively unstable compound has a negative value of free energy and a more stable compound has a positive value at a temperature of about 600° K. Preferably, the cohesion exotherm of the preferred double salts of the present invention, as used in the present composition and fertilizers, is substantially greater than about the cohesion exotherm of AN, and even more preferably is substantially greater than about the cohesion exotherm of the 2:1 ANS double salt.

Another aspect of the present invention provides compositions and methods for reducing the sensitivity to detonation of compositions containing ammonium nitrate by including in such compositions compounds, preferably compounds in the form of double salts with ammonium nitrate, effective to provide a relatively low level the detonation sensitivity of the composition as measured by at least one, and preferably both of: a) increase in onset temperature; or b) increase in DTA heating rate, each relative to the value for same exhibited by ammonium sulfate nitrate 2:1 double salt (2:1 ASN).

For example, a Thermal Gravimetric Analyzer (TGA), model number RT6220 sold by Seiko Instruments has been used to evaluate 2:1 ASN for onset temperature, weight loss (to indicate the presence of a reaction), and the approximate peak drop in heating rate. Those skilled in the art will appreciate that the particular results reported here for these materials, while being generally indicative of the properties of these materials, are used herein primarily for comparison purposes to illustrate the relative performance improvement achieved by compositions and methods of the present invention.

| Sample | Onset (C.) | Loss (wt. %) | DTA (uV) |
|---|---|---|---|
| 2:1 ASN | 222.4 | 38.3 | 2.29 |
| | 222.9 | 41.5 | 2.08 |
| | 222.4 | 39.5 | 1.12 |
| | 220.7 | 38.8 | 1.74 |
| | 224.1 | 41.2 | 1.44 |
| | 223.2 | 39.6 | 1.30 |
| | 223.5 | 38.4 | 2.10 |
| 2:1 ASN Average | 222.7 | 39.6 | 1.72 |
| 2:1 ASN Standard Deviation | 1.1 | 1.3 | 0.45 |

In certain preferred embodiments, the compositions and methods of the present invention produce an onset temperature, preferably as measured in accordance with know use of the TGA Model number RT6220 sold by Seiko Instruments, that is not substantially below about the onset temperature of 2:1 ASN, and more preferably at least about 1° C. above the onset temperature of 2:1 ASN, and more preferably at least about 3° C. above the onset temperature of 2:1 ASN. In certain preferred embodiments, the onset temperature of the present compositions is at least about 220° C., and more preferably at least about 223° C.

In certain preferred embodiments, the compositions and methods of the present invention produce a peak drop in heating rate (PDHR), preferably as measured by differential thermal analysis (DTA) in accordance with know use of the TGA Model No. RT6220 sold by Seiko Instruments, that is not substantially below about the PDHR of 2:1 ASN, more preferably at least about 15 relative percent greater, more preferably at least about 50 relative percent greater than the PDHR of 2:1 ASN, and even more preferably at least about 200 relative percent greater than the PDHR of 2:1 ASN. In certain preferred embodiments, the compositions and methods of the present invention produce a peak drop in heating rate (PDHR), preferably as measured by differential thermal analysis (DTA) in accordance with know use of the TGA Model No. RT6220 sold by Seiko Instruments, that is at least about 0.5 uV greater than, more preferably at least about 1 uV greater than, and even more preferably at least about 2 uV greater than the PDHR of 2:1 ASN.

Preferably the present compositions contain a combined total of $(NH_4)_2SO_4.3(NH_4NO_3)$ double salt and ammonium nitrate ($NH_4NO_3$) of from about 0 to about 3 wt. %, and more preferably the ammonium nitrate is present in any amount of from about 0 to 1 wt. % of the composition, and even more preferably in not more than a trace amount.

EXAMPLES

Comparative Example 1

Ammonium nitrate is tested using a quantum mechanics calculation to determine it characteristic properties and is found to have a reaction free energyexotherm range of from about −0.5 to about −0.9 kcal/gm at temperatures of about 200° K and 600° K, respectively and a cohesion free energyexotherm range of from about 0.06 to about −0.9 kcal/gm at temperatures of about 200° K and 600° K, respectively. The AN is found to be cohesively unstable at temperatures above about 200° K.

Comparative Example 2

Ammonium nitrate is tested using a quantum mechanics calculation to determine it characteristic properties and is found to have a reaction free energy exotherm range of from about −0.5 to about −0.9 kcal/gm at temperatures of about 200° K and 600° K, respectively and a cohesion free energy exotherm range of from about 0.06 to about −0.9 kcal/gm at temperatures of about 200° K and 600° K, respectively. The AN is found to be cohesively unstable at temperatures above about 200° K.

Example 1

A 1:1 double salt of calcium nitrate and ammonium nitrate (CAN) is evaluated to determine its characteristic properties and is found to have a reaction free energy exotherm range of from about 0.65 to about 0.3 kcal/gm at temperatures of about 200° K and 600° K, respectively and a cohesion free energy exotherm range of from about 0.01 to about 0.08 kcal/gm at temperatures of about 200° K and 600° K, respectively.

Example 2

A 2:1 double salt of ammonium nitrate: ammonium phosphate (APN) is evaluated to determine its characteristic properties and is found to have a cohesion free energy exotherm range of from about 0.04 to about −0.07 kcal/gm at temperatures of about 200° K and 600° K, respectively.

Example 3

A 2:1 double salt of ammonium nitrate:potassium nitrate (KAN) is evaluated to determine its characteristic properties and is found to have a reaction free energy exotherm range of from about 0.17 to about −0.21 kcal/gm at temperatures of about 200° K and 600° K, respectively and a cohesion free energy exotherm range of from about 0.12 to about 0.01 kcal/gm at temperatures of about 200° K and 600° K, respectively.

Example 4

A 2:1 double salt of ammonium nitrate:magnesium nitrate (MgAN) is evaluated to determine its characteristic properties and is found to have a reaction free energyexotherm range of from about 0.4 to about −0.2 kcal/gm at temperatures of about 200° K and 600° K, respectively and a cohesion free energyexotherm range of from about 0.1 to about −0.025 kcal/gm at temperatures of about 200° K and 600° K, respectively.

Example 5

A 2:1 double salt of ammonium nitrate:ammonium hexaflouralsilicate (ASiFN) is evaluated using a quantum mechanics calculation to determine its characteristic properties and is found to have a cohesion free energy exotherm range of from about 0.09 to about −0.03 kcal/gm at temperatures of about 200° K and 600° K, respectively.

Example 6

A 2:1 double salt of ammonium nitrate:ammonium molybdenate (AMoON) is tested to determine its characteristic properties and is found to have a cohesion free energy exotherm range of from about 0.05 to about −0.01 kcal/gm at temperatures of about 200° K and 600° K, respectively.

Example 7

A 3:1 double salt of ammonium nitrate:neodymium hydroxynitrate (ANdOHN) is tested to determine its characteristic properties and is found to have a reaction free energyexotherm range of from about −1.06 to about −1.07 kcal/gm at temperatures of about 200° K and 600° K, respectively and a cohesion free energy exotherm range of from about 0.09 to about 0.5 kcal/gm at temperatures of about 200° K and 600° K, respectively. The ANdOHN is found to be cohesively stable.

Example 8

A double salt of ammonium nitrate:potassium nitrate is prepared in a 1:1 molar ratio. The double salt is then tested for onset temperature and DTA in accordance with the procedures indicated above. In addition, weight loss in the composition is monitored and reported. Weight loss is an indicator of the occurrence of a reaction. The test is then repeated. Results are reported in Table 1 below.

TABLE 1

| Onset Temperature (C.) | Weight Loss (wt. %) | DTA (uV) |
|---|---|---|
| 222.4 | 44.0 | 5.10 |
| 219.9 | 42.7 | 1.98 |

As can be seen from the above results, this double salt produces a DTA and an onset temperature within certain preferred embodiments of the present invention.

Example 9

A double salt of ammonium nitrate: ammonium phosphate is prepared in a 1:1 molar ratio. The double salt is then tested for onset temperature and DTA in accordance with the procedures indicated above. In addition, weight loss in the composition is monitored and reported. Weight loss is an indicator of the occurrence of a reaction. The test is then repeated. Results are reported in Table 2 below.

TABLE 2

| Onset Temperature (C.) | Weight Loss (wt. %) | DTA (uV) |
|---|---|---|
| 225.9 | 51.9 | >>1.7 |
| 228.9 | 47.0 | >>1.7 |

As can be seen from the above results, this double salt produces a DTA and an onset temperature within certain preferred embodiments of the present invention.

What is claimed is:

1. A fertilizer composition consisting essentially of one or more double salts of ammonium nitrate, the double salt of ammonium nitrate including ammonium nitrate and at least a second compound, said second compound being present under conditions and in amounts effective to substantially reduce the detonation sensitivity of the composition relative to ammonium nitrate, said second compound being selected from the group consisting of ammonium phosphate, calcium nitrate, potassium nitrate, magnesium nitrate, ammonium molybdenate, ammonium hexafluorosilicate, and combinations of two or more thereof, the fertilizer composition having single salt ammonium nitrate in an amount from about 0 wt. % to about 1 wt. % of the total weight of the composition.

2. The fertilizer composition of claim 1, wherein the second compound of the double salt is selected from the group consisting of ammonium phosphate, magnesium nitrate, ammonium molybdenate, ammonium hexafluorosilicate, and combinations of two or more thereof.

3. The fertilizer composition of claim 1, wherein the second compound of the double salt is selected from the group consisting of ammonium phosphate, ammonium molybdenate, ammonium hexafluorosilicate, and combinations of two or more thereof.

4. A method for reducing the sensitivity to detonation of fertilizer compositions containing ammonium nitrate, the method comprising the step of:

providing a fertilizer composition consisting essentially of at least one double salt of ammonium nitrate, the double salt of ammonium nitrate including ammonium nitrate and at least a second compound selected from the group consisting of ammonium phosphate, potassium nitrate, magnesium nitrate, ammonium molybdenate, ammonium hexafluorosilicate, and combinations of two or more thereof, said second compound being present under conditions and in amounts effective to substantially reduce the detonation sensitivity of the composition relative to ammonium nitrate, the fertilizer composition having single salt ammonium nitrate in an amount from about 0 wt. % to about 1 wt. % of the total weight of the composition.

5. The method of claim 4, wherein the second compound of the double salt is selected from the group consisting of ammonium phosphate, ammonium molybdenate, ammonium hexafluorosilicate, and combinations of two or more thereof.

6. A method of handling fertilizer compositions, the method comprising the steps of:

providing a substantially non-detonatable fertilizer composition consisting essentially of one or more double salts of ammonium nitrate, the double salt of ammonium nitrate including ammonium nitrate and at least a second compound selected from the group consisting of ammonium phosphate, potassium nitrate, magnesium nitrate, ammonium molybdenate, ammonium hexafluorosilicate, neodymium hydroxynitrate, and combinations of two or more thereof, said second compound being present under conditions and in amounts effective to substantially reduce the detonation sensitivity of the composition relative to ammonium nitrate, the fertilizer composition having single salt ammonium nitrate in an amount from about 0 wt. % to about 1 wt. % of the total weight of the composition; and handling the fertilizer composition by transporting the fertilizer composition, storing the fertilizer composition or applying the fertilizer composition to a growing material.

7. The method of claim 6, wherein the second compound of the double salt is selected from the group consisting of ammonium phosphate, ammonium molybdenate, ammonium hexafluorosilicate, and combinations of two or more thereof.

8. A fertilizer composition consisting essentially of one or more double salts of the formula (I):

$$(M).n(NH_4NO_3).m(H_2O) \quad (I)$$

where

M is a cation-anion pair selected from the group consisting of ammonium phosphate, potassium nitrate, magnesium nitrate, ammonium molybdenate, and ammonium hexafluorosilicate, wherein M is present under conditions and in amounts effective to substantially reduce the detonation sensitivity of the composition relative to ammonium nitrate, n is from about 0.2 to about 3, and m is from about 0 to about 10, the fertilizer composition having single salt ammonium nitrate in an amount from about 0 wt. % to about 1 wt. % of the total weight of the composition.

9. The fertilizer composition of claim 8, said one or more double salts having a reaction exotherm at about 600° K greater than about −0.5 kcal/gm.

10. The fertilizer composition of claim 9, wherein said reaction exotherm at about 600° K is greater that about −0.2 kcal/gm.

11. The fertilizer composition of claim 8, said one or more double salts having a cohesive stability temperature of at least about 500° K.

12. The fertilizer composition of claim 10 wherein said one or more double salts having a cohesion exotherm greater than about −0.25 kcal/gm.

13. The fertilizer composition of claim 10 wherein said one or more double salts having a cohesion exotherm greater that about −0.1 kcal/gm.

14. The fertilizer composition of claim 8, wherein M is a cation-anion pair selected from the group consisting of: ammonium phosphate, ammonium molybdenate, and ammonium hexafluorosilicate.

15. A fertilizer composition consisting essentially of one or more double salts of ammonium nitrate, the double salt of ammonium nitrate including ammonium nitrate and at least a second compound, said second compound being present under conditions and in amounts effective to substantially reduce the detonation sensitivity of the composition relative to 2:1 ammonium sulfate nitrate double salt, said second compound being selected from the group consisting of ammonium phosphate, potassium nitrate, magnesium nitrate, ammonium molybdenate, ammonium hexafluorosilicate, and combinations of two or more thereof, the fertilizer composition having single salt ammonium nitrate in an amount from about 0 wt. % to about 1 wt. % of the total weight of the composition.

16. The fertilizer composition of claim 15 wherein said fertilizer composition has an onset temperature greater than the value of an onset temperature exhibited by ammonium sulfate nitrate 2:1 double salt.

17. The fertilizer composition of claim 15 having an onset temperature of at least about 1° C. higher than the value of same exhibited by ammonium sulfate nitrate 2:1 double salt.

18. The fertilizer composition of claim 15 having a peak drop in heating rate greater than the value of same exhibited by ammonium sulfate nitrate 2:1 double salt.

19. The fertilizer composition of claim 15 having a peak drop in heating rate (PDHR) at least about 50% greater than the value of same exhibited by ammonium sulfate nitrate 2:1 double salt.

20. The fertilizer composition of claim 15, wherein the second compound of the double salt is selected from the group consisting of ammonium phosphate, ammonium molybdenate, ammonium hexafluorosilicate, and combinations of two or more thereof.

* * * * *